Aug. 4, 1931.  O. L. SNYDER  1,817,400

CYLINDER HEAD MACHINING FIXTURE

Filed Oct. 7, 1929   3 Sheets-Sheet 1

INVENTOR
Oscar L. Snyder

BY  W. W. Harris

ATTORNEY

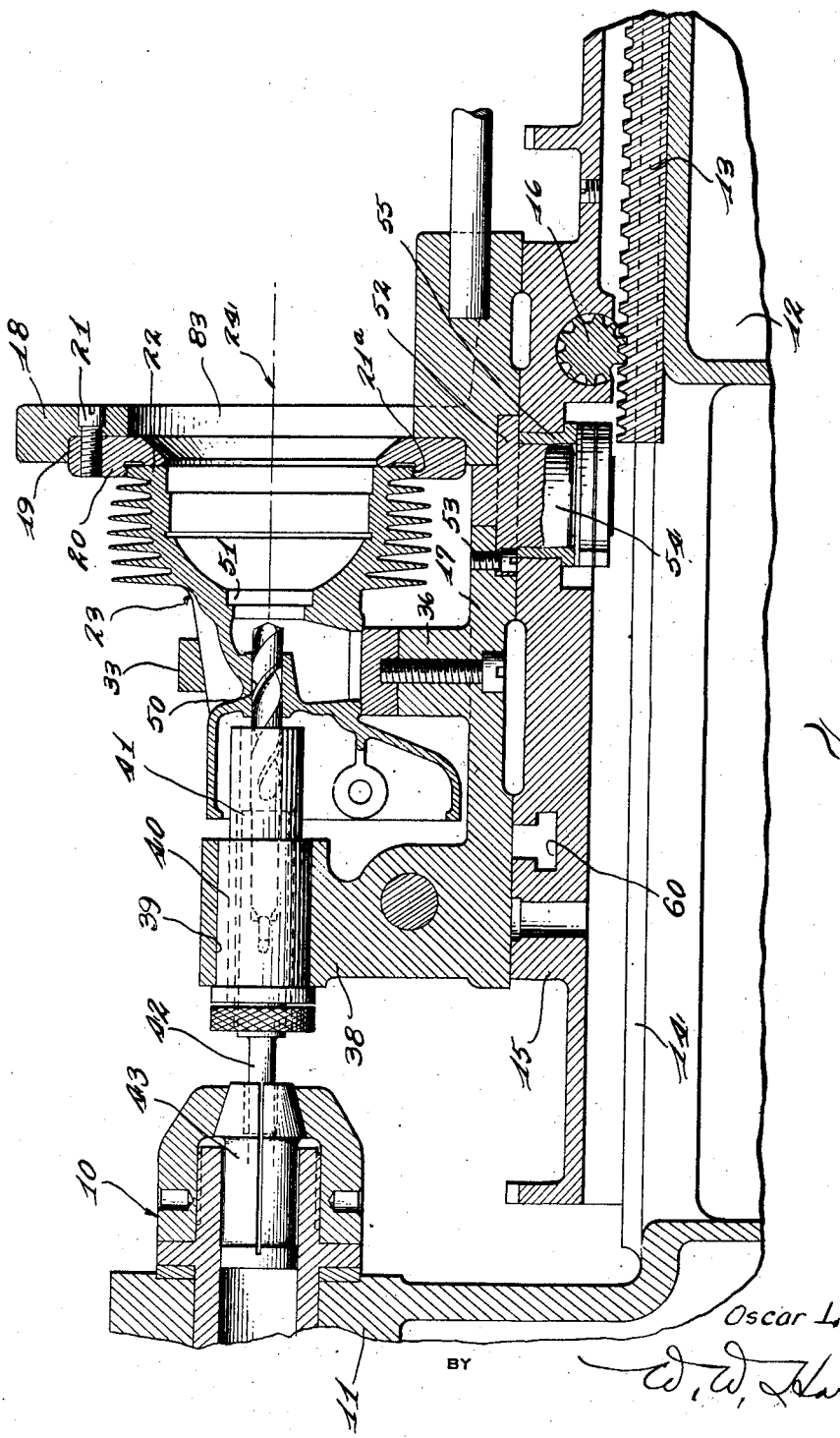

Aug. 4, 1931.   O. L. SNYDER   1,817,400
CYLINDER HEAD MACHINING FIXTURE
Filed Oct. 7, 1929   3 Sheets-Sheet 3

INVENTOR
Oscar L. Snyder
BY
ATTORNEY

Patented Aug. 4, 1931

1,817,400

UNITED STATES PATENT OFFICE

OSCAR L. SNYDER, OF MARYSVILLE, MICHIGAN, ASSIGNOR, BY MESNE ASSIGNMENTS, TO CONTINENTAL AIRCRAFT ENGINE COMPANY, A CORPORATION OF DELAWARE

CYLINDER HEAD MACHINING FIXTURE

Application filed October 7, 1929. Serial No. 397,774.

This invention relates to machine lathe attachments and is more particularly related to work supports for attachment with a lathe and of the type that are arranged to adjustably position the work with respect to a tool, the lathe attachment, hereafter described, being particularly adapted for use in machining holes in a cylinder head casting of an internal combustion engine, the said holes having axes that extend radially from a common point of intersection.

A cylinder head of an aircraft internal combustion engine of the radial type is provided with aligned holes arranged in sets, two sets of holes being commonly employed, one set adapted to be utilized in conjunction with the intake valve and the other set with the exhaust valve. Exceedingly great care must be exercised in machining each set of aligned holes in order to insure the proper alignment of the valve guide with respect to the valve and valve seat associated therewith. It has been the custom to machine these aligned holes in the cylinder head casting of engines of this type in separate operations requiring separate set ups of the work. Thus, considerable time was consumed in accurately aligning the work with respect to the tool and the chances for error were greater, often resulting in inaccurately machined engine castings which are wasted. Consequently, the production of radial engines of this type has been unnecessarily restricted because of the excessive amount of time and labor required in machining these engine castings.

It is the object of my invention to facilitate the production of internal combustion engines of the radial type, by providing means, which enable the manufacturer to more economically and efficiently machine the cylinder head castings.

Another object of my invention is to facilitate the production of cylinder head castings of a radial internal combustion engine by providing an improved lathe attachment provided with means for readily aligning the cylinder head castings with the machining elements, thereby insuring more accurate machining and decreasing the chances for error in the production of machined cylinder head castings.

A further object of my invention is to facilitate the production of cylinder head castings of a radial internal combustion engine by providing a lathe attachment of improved construction, which is provided with means for supporting the work, whereby an increased number of machining operations can be performed on the cylinder head casting without resetting or realigning the said cylinder head casting in the machine, thereby insuring more accurate work, besides increasing the speed, with which the cylinder head castings may be produced.

A still further object of my invention is to further facilitate the mass production of cylinder head castings by providing a lathe attachment of improved construction wherein the work can be more readily aligned with respect to the tool or tools, and which permits the interchange of tools and the machining of aligned holes or recesses of different design without readjustment or realignment of the work for the various machine operations required in machining such aligned holes or recesses, thereby insuring the production of cylinder head castings with true and accurately aligned holes with a minimum of time and labor.

For a more detailed understanding of my invention, reference may be had to the accompanying drawings, which illustrate one form which my invention may assume, and in which:

Figure 2 is a vertical longitudinal sectional view thereof taken substantially on the line 2—2 of Figure 1; and illustrating one of the machining operations, and the tool for performing such operation;

Figure 1:
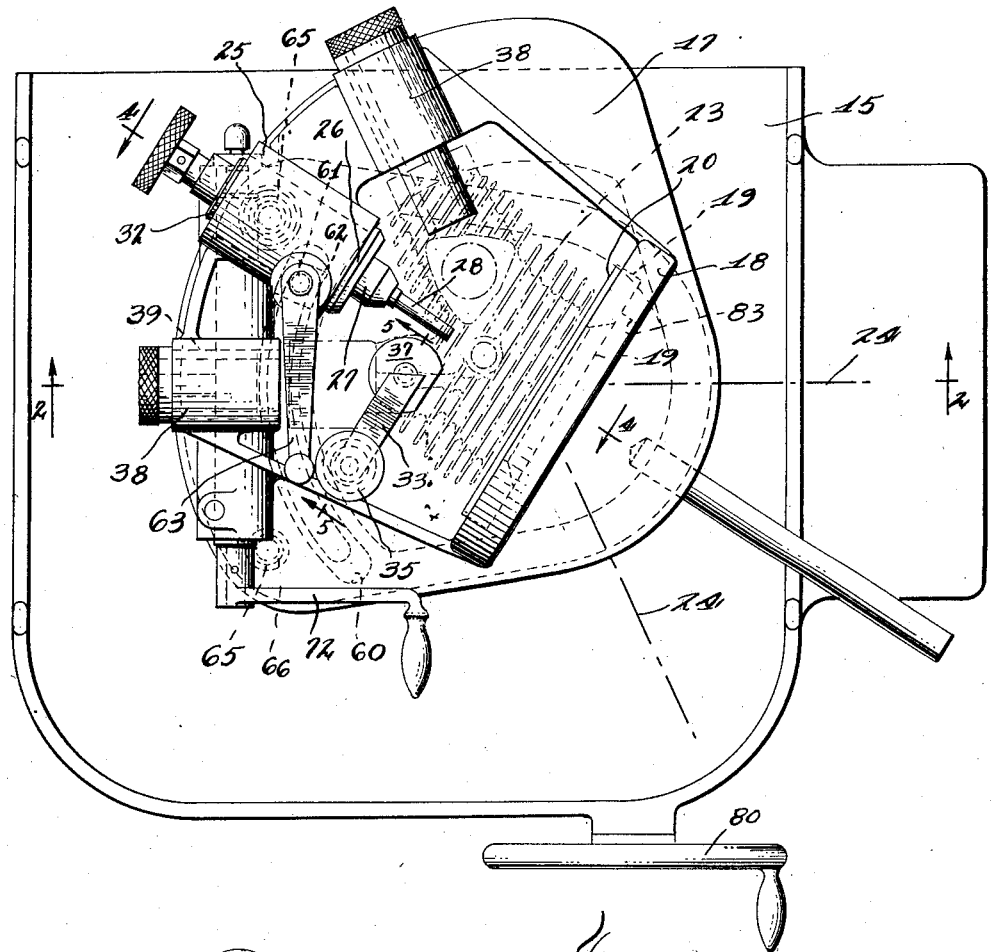
Figure 1 is a plan view of a lathe attachment constructed in accordance with my invention.
Figure 5:
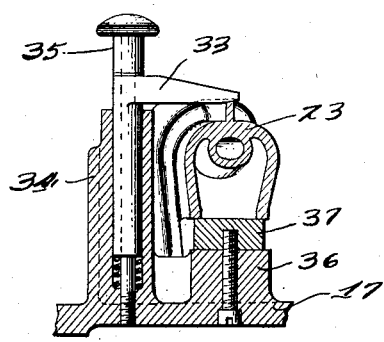
Figure 5 is a detailed sectional view of the clamping means for securing the work to a work carriage and taken substantially on the line 5—5 of Fig. 1.
Figure 4:
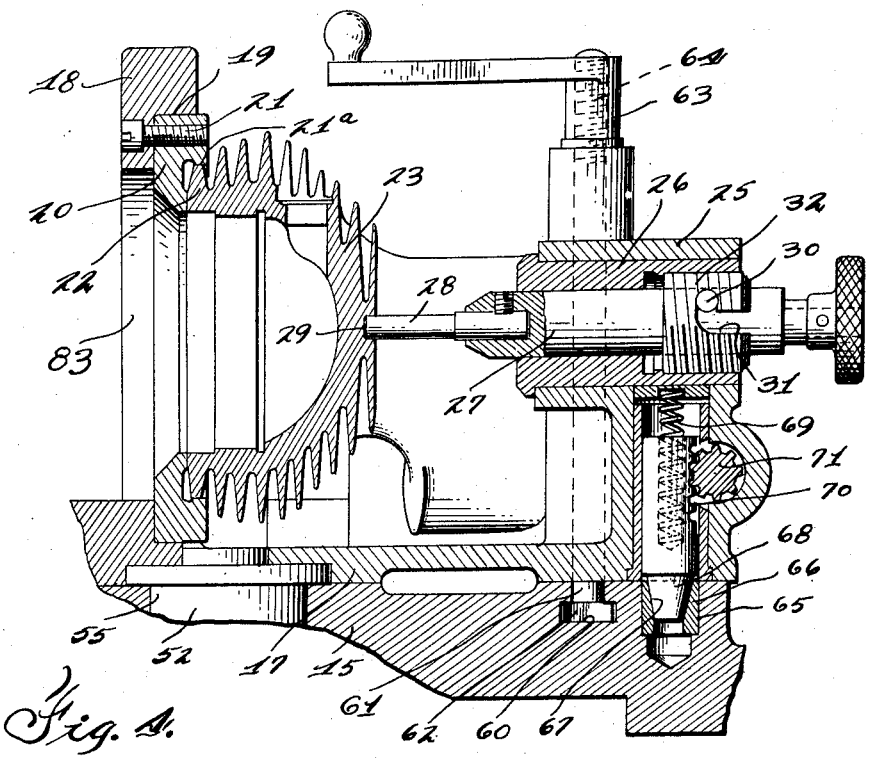
Figure 4 is a detailed sectional view of the means for adjustably securing the work to a work carriage taken on the line 4—4 of Figure 1.

The lathe attachment illustrated in the accompanying drawings is adapted for attachment with a standard type of lathe, wherein power is applied to a drive shaft (not shown) that is operatively connected in any suitable manner to a tool holder 10, which is supported in a head stock 11 carried by a table 12. The table 12 is provided with a rack 13 and with suitable guides 14 for supporting a base structure 15 adapted for longitudinal movement with respect to the table. This base structure may be moved longitudinally of the machine in a path parallel to the axis of the tool holder, this movement being imported thereto by means of a pinion 16 rotatably suported by the base structure and arranged to engage with the rack 13 carried by the table structure.

A work carriage is adapted to be pivotally supported by the base structure and comprises a casting constructed to form a bed 17, the underside of which is machined and arranged to readily slide on the upper machined face of the base structure. The work carriage is provided with an upwardly projecting bracket 18, that is provided with a circular recess 19 for receiving a pilot 20, which may be secured to the bracket by screws 21 or other suitable fastening devices. This pilot is provided with a circular recessed portion 21a adapted to receive the inner circular flange portion 22 of a cylinder head casting 23 having a plurality of sets of aligned holes. The recess in the pilot serves to accurately locate the cylinder head casting and position the same with respect to the work carriage, so that the axes of the aligned holes carried by the cylinder head casting and designated by the reference character 24, are properly aligned with respect to the axis of the tool holder. A boss 25 is located in spaced relation with respect to the bracket 18 and is provided with a bearing 26 for supporting a clamping device 27. This clamping device being arranged to be readily and quickly projected into engagement with the cylinder head casting to clamp the said cylinder head to the pilot. The clamping device 27 is provided with a pin 28 that is arranged to be projected into the recess 29 carried by the cylinder head casting 23. A pin 30 carried by the clamping device is adapted to be locked within the bayonet slot 31 in the adjustable sleeve 32, which is adjustably secured to the bearing 26, and this adjustable sleeve is so constructed, that the same, may be adjusted in such a way as to hold the pin 28 firmly against the cylinder head casting, when the pin has been projected to its limit as controlled by the bayonet slot 31. A yieldable clamp 33 carried by the boss 34, integrally cast to the work carriage is adapted to be engaged with a portion of the cylinder head casting by means of the adjusting screw 35 thereby firmly clamping the cylinder head casting to the work carriage. A boss 36 carried by the work carriage is adapted to support a block 37 on which the cylinder head casting rests, this block being preferably positioned immediately below the clamp 33 and so located as to permit one of the cylinder extensions to be supported thereby and clamped thereto.

It will be noted that the cylinder head casting may be very quickly assembled to the work carriage and secured thereon in a predetermined adjusted position in the shortest possible time, as the clamp members 27 and 33 are very quickly brought into operation and actuated to clamp the work to the carriage in a predetermined adjusted position.

Suitable bearings for supporting a tool are carried by the work carriage and are so located as to be aligned with the longitudinal axis of the diverging extensions of the cylinder head, these bearings designated by the reference characters 38, being provided with a central bore or opening 39 for supporting a bearing 40, which in turn supports a tool structure 41, said tool structure provided with a tapered shank 42 that is adapted to be secured in a pneumatically operated chuck 43 carried by the tool holder 10. The cylinder head casting is provided with two sets of aligned holes, each set comprising a pair of holes 50 and 51. The axis of each set of aligned holes are adapted to intersect at a common point of intersection, and the carriage is arranged to be pivoted to the base structure 15 about an axis that passes through this common point of intersection of the axes of said aligned holes.

Any suitable form of pivoting structure may be incorporated with the lathe attachment. My pivot comprises a pivot member 52, that is adapted to be secured to the underside of the work carriage by the screws 53 and is provided with a depending stub shaft 54 that is rotatably supported in a bearing structure 55 carried by the base structure 15. Thus the work carriage is free to move with respect to the base structure 15, this movement being limited and so controlled as to position the work carriage in such a way, as to align either one of the bearings 38 with the tool. The base structure 15 is provided with an inverted T-slot 60 and the carriage carries a bolt 61 provided preferably with a square head 62 at its lower end for engagement in said inverted T-slot 60. This bolt is adapted to be actuated and to be drawn upwardly by means of the internally threaded and manually operated lock member 63, which engages the threaded portion 64 at the upper end of the bolt 61 and thus tightly clamp the work carriage to the base structure when the same has been located in the desired position.

In order to quickly position the carriage as desired, the base structure 15 is provided with pilot means comprising the recesses 65 which are each located at predetermined points, these recesses each provided with the inserts or plugs 66 having a tapered recess 67 therein for receiving the tapered end of a plug 68 carried by the work carriage. The plug 68 is yieldingly forced into one of the tapered recesses 67 by means of a spring 69, the plug 68 being further provided with a number of ratchet teeth 70 which are adapted to be engaged by a pinion 71 manually operated by means of the handle 72. As the said handle 72 is rotated, the plug 68 is either projected into the tapered recess 67 or retracted therefrom. As will be noted these pilot means carried by the base structure 15 are so located, that when the plug or pin 68 is engaged therein, the work carriage will be so positioned as to permit the machining of one of the sets of aligned holes in said cylinder head casting. When this set of holes has been machined the plug 68 is retracted and the work carriage is swung around on its pivot until the plug 68 comes in registration with another tapered recess or socket 67, the plug being then projected into the recess to accurately position the work carriage with respect to the tool so that another set of said holes may be accurately machined.

Figure 3:
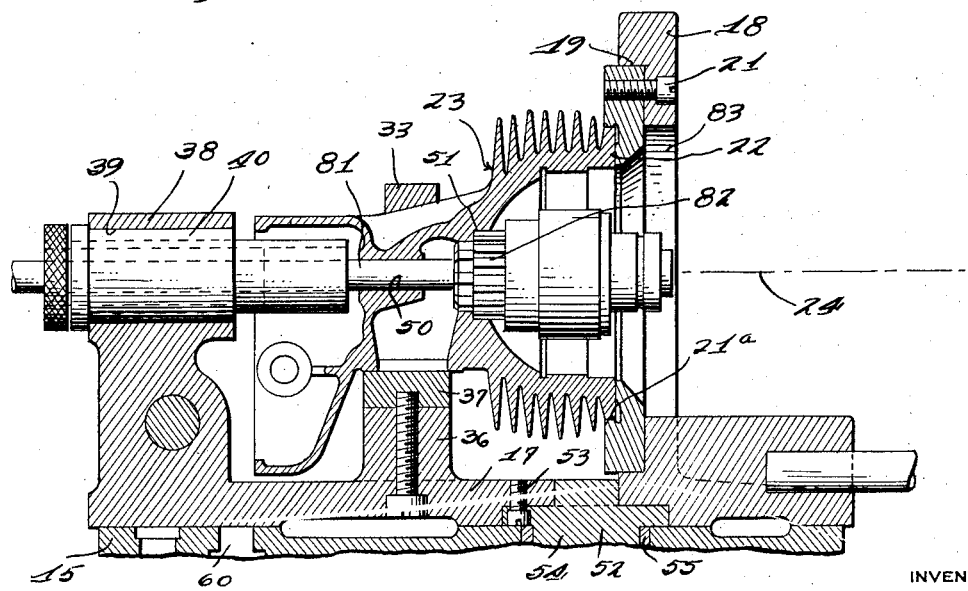
Figure 3 is a similar sectional view illustrating another one of the machining operations.

In the operation of the machine, the hole 50 of the cylinder head casting is first drilled and reamed after which the handle 80 operatively connected with the pinion 16 is operated to retract or move the base structure 15 away from the head stock of the lathe to permit the tool just used to be removed and another tool for performing another operation on the work to be inserted and clamped into the tool holder. This latter tool is illustrated in Figure 3 and is provided with a shank 81 that is of the same diameter as the diameter of the hole 50 that was just machined and this tool carries suitable cutting or reaming cutters 82, which are constructed to machine the hole 51. The tool used in this latter operation is inserted through the hole 83 in the bracket 18, and the shank 81 is projected through the aligned holes of the cylinder head casting and into the pneumatic chuck carried by the tool holder and secured therein. The work carriage is moved away from the tool holder, the cutters 82 engaging the walls of the hole to perform the desired machining operation. It will be noted, however, that the shank 81 of the tool has a bearing in the hole 50 of the cylinder head and it is therefore so supported as to machine the hole 51 in perfect alignment with the hole 50.

It will be noted that each set of holes of the cylinder head casting can be accurately machined without disturbing the adjustment of the cylinder head casting with respect to the work carriage which supports the same, both of the holes 50 and 51 being accurately machined in perfect alignment without readjusting or realigning the work with respect to the tool. After one set of holes has been machined, the work carriage may be very readily and accurately positioned in such a way as to align the other set of holes with the tool after which the same circle of machining operations may be performed to accurately machine the second set of aligned holes.

It may be further noted that the cylinder head casting is very quickly and readily locked in the predetermined position on the work carriage and the means for securing said cylinder head casting to the work carriage are so constructed as to not interfere with the machining operations or with the actuation of the work carriage when changing from one adjusted position to another.

Although I have illustrated but one form of my invention and have described in detail but a single application thereof, it will be apparent to those skilled in the art to which my invention pertains, that various modifications and changes may be made therein without departing from the spirit of my invention or from the scope of the appended claims.

What I claim as my invention is:

1. In a cylinder head supporting device, the combination of a base, a cylinder head carrier movably supported by said base and adapted to be moved into operative position with respect to a tool, means for locating said carrier with respect to said tool, and means for moving said base, carrier and cylinder head in a direction parallel to the axis of the tool.

2. In a cylinder head supporting device, the combination of a base, a carrier movably supported by said base and adapted to be moved into operative position with respect to a tool, means for locating said carrier with respect to the tool, means for clamping a cylinder head to said carrier, and means for moving said base, carrier and cylinder head in a direction parallel to the axis of the tool.

3. In a cylinder head supporting device, the combination of a movable base, a cylinder head carrier pivotally supported by said base and adapted to be rotated into operative position with respect to a tool, means for locating said carrier with respect to said tool, and means for moving said base in a direction parallel with the axis of the tool.

4. In a cylinder head supporting device, the combination of a movable base, a cylinder head carrier movably supported by said base and adapted to be moved into operative position with respect to a tool, yieldable means for locating said carrier with respect to said tool, and means for moving said base in a direction parallel to the axis of the tool.

5. In a cylinder head supporting device, the combination of a movable base, a cylinder head carrier movably supported by said base and adapted to be moved into operative position with respect to a tool, a retractable spring latch for locating said carrier with respect to said tool, and means for moving said base in a direction parallel to the axis of the tool.

6. In a cylinder head supporting device, the combination of a table provided with means for supporting a tool, a base supported by said table and movable longitudinally with respect to the table in a direction parallel to the axis of the tool, a cylinder head carrier pivotally supported by said base, said base adapted to be moved relatively to said table to advance the carrier with respect to the tool carried by said table, and means for locating the carrier to position the cylinder head carried thereby with respect to the tool.

7. In a cylinder head supporting device, the combination of a table provided with means for supporting a tool, a base movably supported by said table and movable longitudinally with respect to the table in a direction parallel to the axis of the tool, a cylinder head carrier pivotally supported by said base, said base adapted to be moved relatively to said table to advance the carrier with respect to the tool, means for locating the carrier to selectively position the cylinder head carried thereby with respect to the tool, and means for locking the carrier to said base.

8. In a cylinder head supporting device, the combination of a movable base, a cylinder head carrier adjustably supported by said base to adjustably position a cylinder head carried thereby with respect to the axis of a tool, said base movable in a direction parallel to the axis of the tool, pilot means carried by said carrier for positioning the cylinder head, and means for securing the said cylinder head to said carrier.

9. In a cylinder head supporting device, the combination of a movable base, a cylinder head carrier adjustably supported by said base to adjustably position a cylinder head carried thereby with respect to the axis of a tool, said base movable in a direction parallel to the axis of the tool, pilot means carried by said carrier and constructed for receiving the base of a cylinder head to position the same, and securing means engaging another portion of said cylinder head to lock the cylinder head to said carrier.

10. In a cylinder head supporting device, the combination of a base, a cylinder head carrier adjustably supported by said base to adjustably position a cylinder head carried thereby with respect to a tool, a pilot carried by said carrier and provided with a seat constructed to receive a portion of said cylinder head to position the same, means for clamping the cylinder head to said pilot, and additional means for securing the cylinder head to said carrier.

11. In a cylinder head supporting device, the combination of a base, a cylinder head carrier adjustably supported by said base to adjustably position a cylinder head carried thereby with respect to a tool, a pilot carried by said carrier and provided with a seat constructed to receive a portion of said cylinder head to position the same, and a retractable locking member for clamping the cylinder head to said carrier and pilot seat and serving to further position the cylinder head.

12. In a cylinder head supporting device, the combination of a base, a cylinder head carrier adjustably supported by said base to adjustably position a cylinder head carried thereby with respect to a tool, a pilot ring supported by said carrier and provided with a recessed portion forming a seat for receiving a portion of a cylinder head, means for clamping said cylinder head to said seat, and means for securing said cylinder head to the carrier.

13. In a cylinder head supporting device, the combination of a base, a cylinder head carrier adjustably supported by said base to adjustably position a cylinder head carried thereby with respect to a tool, a pilot ring supported by said carrier and provided with a circular recessed portion forming a seat for receiving the inner circular rim portion of said cylinder head, means for clamping said cylinder head to said seat, and means for securing said cylinder head to the carrier.

14. In a device for machining a cylinder head casting having a plurality of aligned holes, a table, a tool holder, means carried by the table for supporting said tool holder, means for supporting and aligning a cylinder head casting with respect to said tool holder, and a tool carried by said tool holder and supported in operative position in one of the aligned holes in the cylinder head casting when machining another one of said aligned holes.

15. In a device for machining a cylinder head casting provided with a plurality of sets of aligned holes having axes which intersect at a common point, a table, a tool holder, means for supporting said tool holder, a carriage for supporting said cylinder head casting and provided with means for positioning the cylinder head casting carried thereby, and means for pivotally supporting said carriage to the table about an axis passing through the common point of intersection of said axes to permit the alignment of a set of aligned holes of the cylinder head casting with said tool holder.

16. In a device for machining a cylinder head casting provided with a plurality of sets of aligned holes having axes intersecting in a common point, a table, a tool holder, means for supporting said tool holder in fixed relation with respect to said table, a base carried by said table and movable in a path parallel to the axis of said tool holder, a work carriage for supporting said cylinder head casting and pivoted to said base about an axis passing through the common point of intersection of said axes of said aligned holes, and means responsive to manual operation for adjustably positioning said work carriage to align a set of aligned holes carried by said cylinder head casting with the axis of said tool holder.

17. In a device for machining a cylinder head casting provided with a plurality of sets of aligned holes having intersecting axes, a tool holder, a work carriage to which said cylinder head casting may be secured and means for adjustably positioning said work carriage to selectively align the axis of a set of aligned holes of said cylinder head casting with the axis of said tool holder.

18. In a device for machining a cylinder head casting provided with a plurality of sets of aligned holes having axes which extend radially from a common point, a support, a tool holder supported thereby and having an axis intersecting said common point of intersection of aforesaid axes, a work carriage pivoted to said support and provided with means for supporting a cylinder head casting, and means for adjustably positioning said work carriage to selectively align the axis of a set of aligned holes of said cylinder head casting carried thereby with the axis of said tool holder, said support movably supported to have relative movement with respect to said tool holder in a direction parallel to the axis of the tool holder.

19. In a device for machining a cylinder head casting provided with a plurality of sets of aligned holes, a tool holder, a work carriage to which said cylinder head casting may be secured and movably supported to have relative movement with respect to said tool holder in a direction parallel to the axis of the tool holder, and means adjustably positioning said work carriage to selectively align the axis of a set of aligned holes of said cylinder head casting with the axis of said tool holder.

In testimony whereof I affix my signature.

OSCAR L. SNYDER.